(12) United States Patent
Ito et al.

(10) Patent No.: US 9,122,347 B2
(45) Date of Patent: Sep. 1, 2015

(54) INFORMATION PROCESSING APPARATUS, INFORMATION PROCESSING METHOD, AND PROGRAM STORAGE MEDIUM

(71) Applicant: Canon Kabushiki Kaisha, Tokyo (JP)

(72) Inventors: Hikaru Ito, Tokyo (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 13/754,085

(22) Filed: Jan. 30, 2013

(65) Prior Publication Data

US 2013/0201160 A1    Aug. 8, 2013

(30) Foreign Application Priority Data

Feb. 3, 2012    (JP) ................. 2012-022076

(51) Int. Cl.
*G06F 3/041* (2006.01)
*G06F 3/045* (2006.01)
*G06F 3/0488* (2013.01)

(52) U.S. Cl.
CPC ............ *G06F 3/0418* (2013.01); *G06F 3/0488* (2013.01); *G06F 2203/04808* (2013.01)

(58) Field of Classification Search
CPC ................ G06F 3/0418; G06F 2203/04808; G06F 3/0488
USPC .......................................... 345/178
See application file for complete search history.

(56) References Cited

U.S. PATENT DOCUMENTS

2009/0021489 A1* 1/2009 Westerman et al. .......... 345/173

FOREIGN PATENT DOCUMENTS

JP           2011-134069 A    7/2011

* cited by examiner

*Primary Examiner* — Charles V Hicks
(74) *Attorney, Agent, or Firm* — Canon USA Inc. IP Division (57) ABSTRACT

In a case where a plurality of touch points touching on a touch panel is detected, a touch point changed from a previous state among the plurality of touch points is determined to be valid, whether a touch point not changed is valid is determined, and information regarding the touch point determined to be valid is recognized as an input.

27 Claims, 9 Drawing Sheets

INFORMATION PROCESSING APPARATUS, INFORMATION PROCESSING METHOD, AND PROGRAM STORAGE MEDIUM

BACKGROUND OF THE INVENTION

1. Field of the Invention

The present invention generally relates to information processing and, more particularly, to a technology of rectifying an erroneous operation caused by recognition of touching unintended by a user in an apparatus capable of carrying out a touching operation.

2. Description of the Related Art

Recently, a touch input device has gained in popularity, which captures X and Y coordinate values of a touched position as input values in response to touching of a screen by a user's finger or a stylus, and executes various processes based on the input values.

In many cases, it is desirable to design such touch input devices so that areas of screens is large as much as possible. Due to the large area of the screen, if the screen occupies the most part of the apparatus, when the user holds the touch input device by hand, the user can happen to touch the screen unintentionally. In a touch input device capable of carrying out multiple touching operations, when the user touches the screen by mistake, more touch inputs than intended by the user may be recognized, causing erroneous operations.

Japanese Patent Application Laid-Open No. 2011-134069 discusses a technology in which, when the user touches a table-top touch input device, it is recognized based on a shape of a contact region whether it is a user's finger. There is known a technology for determining that the user has touched the screen by mistake rather than a touching operation based on this recognition result. In this case, erroneous recognition is prevented by excluding the mistakenly touched region from touch input detection targets.

However, in the touch input device, when a part of the screen is touched to support the device itself, determination that this point has been touched is not desirable. To describe a reason for this more specifically, consideration will be given to a case where the user carries out a touching operation trying to execute an intended operation while touching a part of the screen. In this case, in the case of a product allowing multiple touching operations, an erroneous operation may occur because multi-touching is detected based on a point first touched to support the device and a point newly touched to carry out the touching operation. Further, since there is a case that the touch point for the device support and the touch point for the touch operation are similar to each other in the shapes of the contact regions, it is difficult to distinguish the two touch points based on only the shapes of the contact regions.

SUMMARY OF THE INVENTION

The present disclosure is directed to a technology of estimating or considering a status where a user is attempting to carry out an originally intended operation and invalidating a contact point not intended by the user at desirable timing.

According to an aspect of the present disclosure, an information processing apparatus includes a detection unit configured to detect a touch point on a touch panel touched by a user, a determination unit configured to determine, in a case where the detection unit detects a plurality of touched touch points, whether a touch point not changed from a previous state among the plurality of touch points is valid, and a recognition unit configured to recognize information regarding the touch point determined to be valid by the determination unit as input information.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings.

The embodiments are only examples of the present disclosure. Thus, the disclosure is not limited to the embodiments.

Figure 1A:
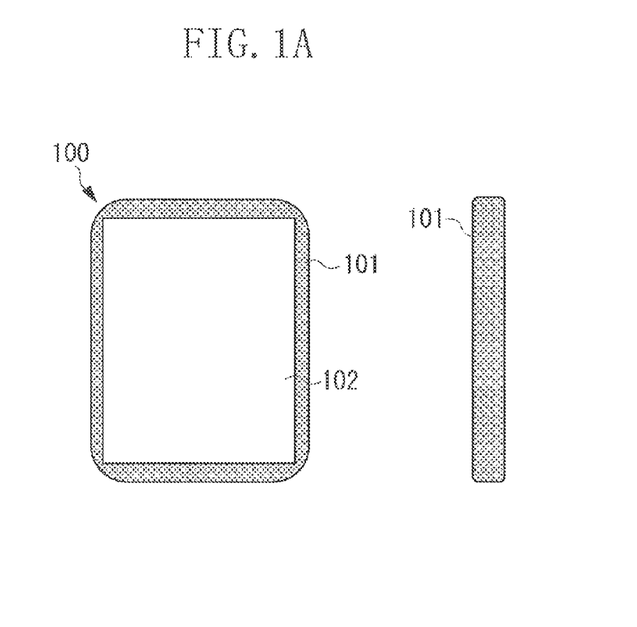
FIG. 1A illustrates an example of an appearance of an information processing apparatus.
Figure 1B:
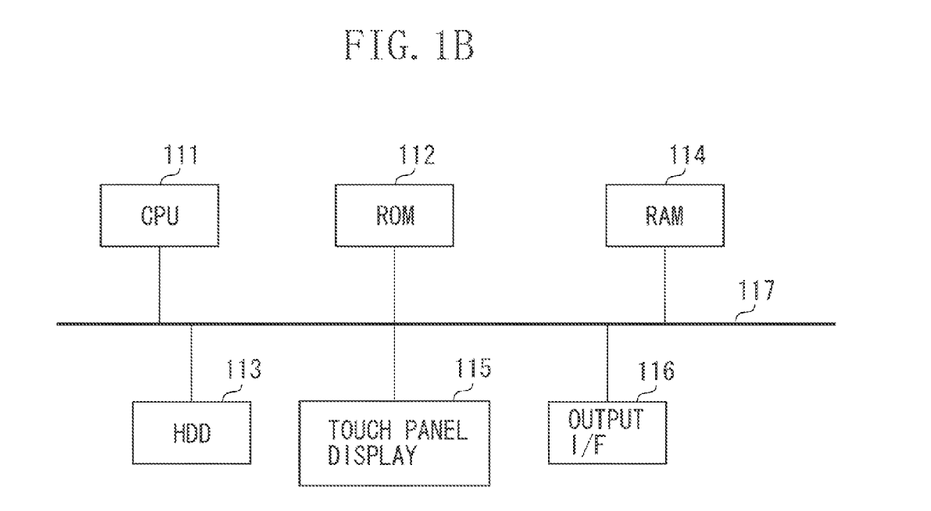
FIG. 1B is a block diagram illustrating an example of a hardware configuration of the information processing apparatus.
Figure 1C:
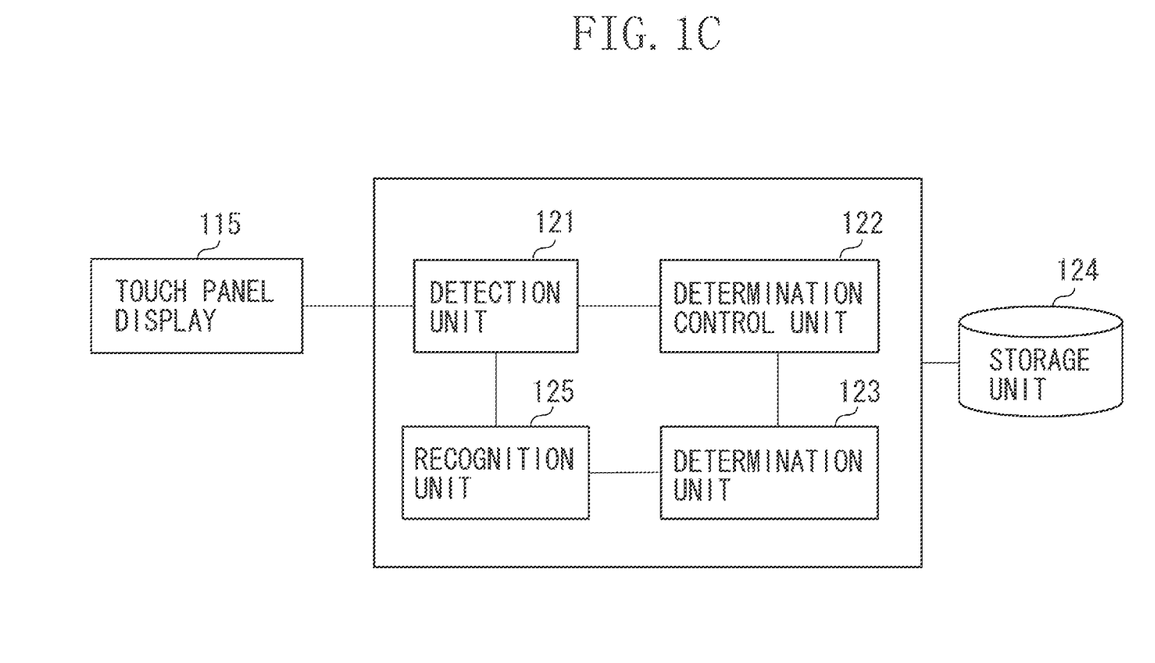
FIG. 1C illustrates an example of a functional configuration of the information processing apparatus.

First, the first exemplary embodiment of the present disclosure will be described. FIGS. 1A to 1C illustrate examples of an appearance of an information processing apparatus 100 and a hardware configuration according to the exemplary embodiment. FIG. 1A illustrates an appearance of a portable terminal that is an example of the information processing apparatus 100 when seen from front and side faces of a screen. In FIG. 1A, a case 101 is an outer peripheral portion of an input region 102 made of a synthetic resin or a metal. When supporting the information processing apparatus 100, a user normally holds a part of the case 101. The input region 102, which receives an input by user's touching to the information processing apparatus 100, includes a touch sensor. In the present exemplary embodiment, the input region 102 includes a touch panel display having the touch sensor installed on a display as a display unit. On this display screen, an interface for operating the information processing apparatus 100 or an apparatus connected to the information processing apparatus 100 is displayed. Hereinafter, in the present exemplary embodiment, the example of the information processing apparatus 100 that is the portable terminal illustrated in FIG. 1A will be described.

In the present exemplary embodiment, among points of the input region 102 touched by the user (hereinafter, touch points), a point of the input region 102 touched to support the information processing apparatus 100 by hand is considered not an input for operating the information processing apparatus 100, and thus the input is invalidated. Processing to determine whether an input by a touch point is valid is carried out when there is a plurality of touch points independently or simultaneously detected in the input region 102 and the number of detected touch points increases. This is because a high possibility that the user is starting a certain operation when the number of touch points increases necessitates accurate recognition of a valid input. Further, in the present embodiment, it is determined whether a touch point not latest among the plurality of detected touch points is valid since it is highly likely that among the plurality of detected touch points, a latest touch point of the input region 102 has been touched by the user to carry out an operation.

FIG. 1B is a block diagram illustrating an example of the hardware configuration of the information processing apparatus 100 according to the present exemplary embodiment. In FIG. 1B, the information processing apparatus 100 includes a central processing unit (CPU) 111, a read-only memory (ROM) 112, and a hard disk drive (HDD) 113. In the present exemplary embodiment, the CPU 111 reads a control program stored in the ROM 112 or the HDD 113, and executes the program to control each device. This control program causes the information processing apparatus 100 to carry out various operations illustrated in flowcharts of FIG. 2, FIGS. 3A and 3B, and FIG. 6 described below. The ROM 112 stores such control programs or various data used for the programs.

A random access memory (RAM) 114 has a work area of the program of the CPU 111, a data save area during error processing, and a load area of the control program. The HDD 113 stores various control programs or various data. A touch panel display 115 is a device serving both as a touch sensor for capturing operation information of the user in the input region 102 and as a display screen for outputting display. In the present exemplary embodiment, the touch sensor of a capacitance type is used, and a coordinates of one point in a contact surface between a user's finger (operation portion) and a panel surface is identified as a touch point. However, not limited to the capacitance type, a sensor of a pressure-sensitive type or an optical sensor type may be used.

An output interface (I/F) 116 is an interface for outputting various pieces of information to an output device other than the display via a network. A bus 117 transfers an address signal instructing a component to be controlled by the CPU 111, a control signal for controlling each component, and data transferred between devices. The control program may be stored beforehand in the ROM 112 or the HDD 113, or received from an external apparatus via a network to be stored in the ROM 112 or the HDD 113 when necessary. The CPU 11 executes the program stored in the ROM 112 or the HDD 113, thereby carrying out various functions of the information processing apparatus 100 described below or various operations illustrated in the flowcharts of FIG. 2, FIGS. 3A and 3B, and FIG. 6.

FIG. 1C is a block diagram illustrating an example of a software configuration of the information processing apparatus 100. A detection unit 121 acquires a signal from the touch sensor of the touch panel display 115, and detects information regarding a touch point touched by the user. The information regarding the touch point is, for example, coordinate information indicating a position of the touch point in the input region 102, or information indicating detection time of the touch point at this position or information indicating a detected order. A determination control unit 122 controls a determination unit 123 based on a change in number of touch points detected by the detection unit 121 or movement of the touch point to execute processing for determining whether the detected touch point is valid as an input to the information processing apparatus 100. The determination unit 123 determines whether the touch point is valid as the input to the information processing apparatus 100 according to an instruction from the determination control unit 122. A storage unit 124 stores the information regarding the touch point detected by the detection unit 121, and the determination control unit 122 and the determination unit 123 refer to the stored information to operate.

A recognition unit 125 receives a determination result from the determination unit 123, and acquires information regarding a valid touch point from those stored in the storage unit 124 to recognize it as input information. When an input by user's touching is recognized, control is carried out to output a result corresponding to the input. In the present exemplary embodiment, each of these functional units includes a CPU, a ROM, and a RAM. The CPU develops in the RAM a program stored in the ROM and executes the program to realize the function. However, in the present exemplary embodiment, these functional units can similarly be realized by hardware in the information processing apparatus 100.

Figure 2:
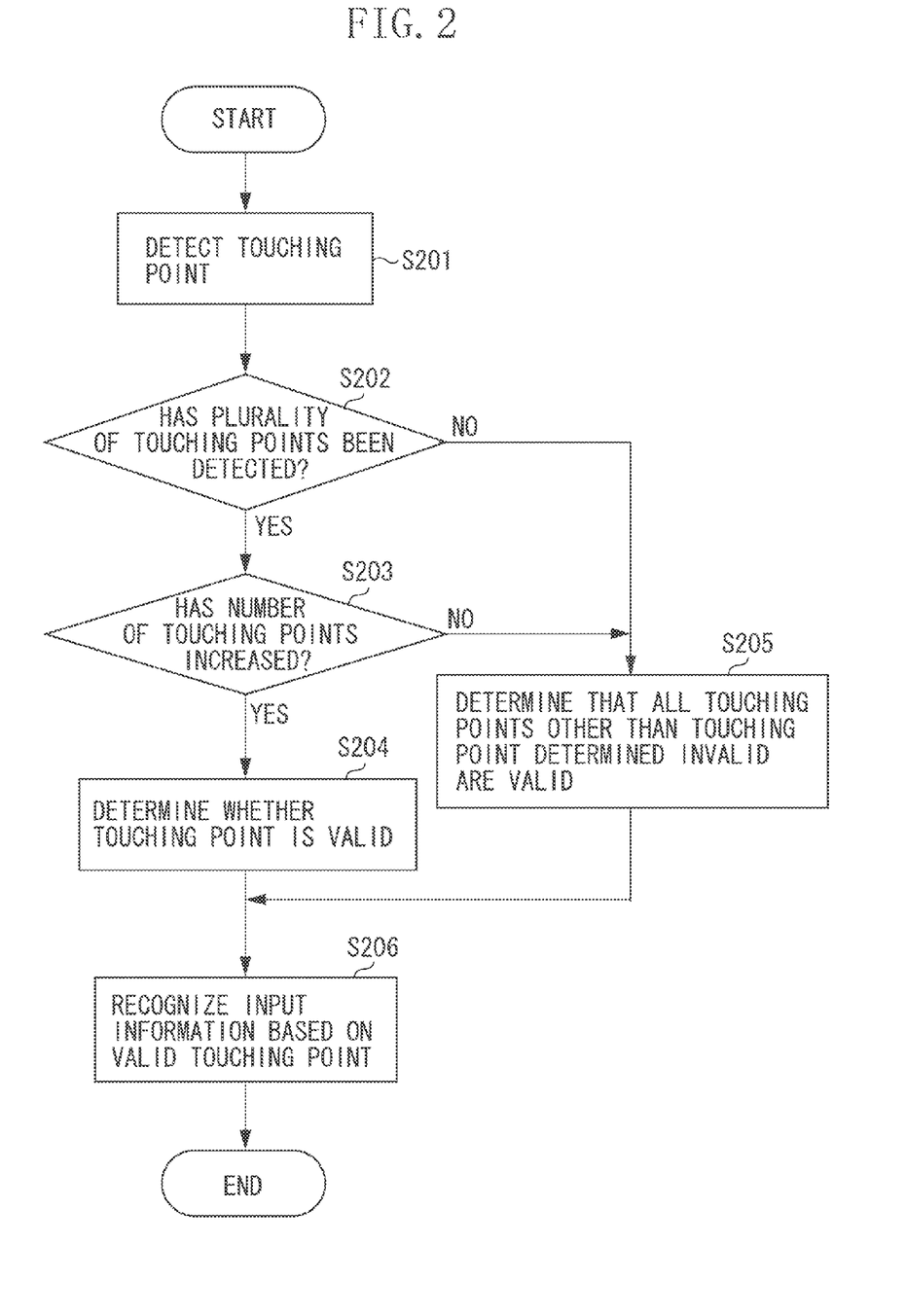
FIG. 2 is a flowchart illustrating an example of a processing flow of recognizing a user's touch input.

Next, referring to the flowchart of FIG. 2, a processing flow of recognizing a user's touch input according to the present exemplary embodiment will be described. First, in step S201, the detection unit 121 detects information regarding a touch point of a user. In this case, the touch sensor of the touch panel display 115 detects a user's finger touching in the input region 102 to carry out an operation, and the detection unit 121 detects information regarding a touched position in the input region 102 based on the information acquired from the touch sensor. Further, information regarding a first time when a touch point and identification (ID) of the touch point are detected can be stored in the storage unit 124. In the present exemplary embodiment, the position information is indicated by coordinates (x, y) based on a coordinate plane where a left upper side of the input region 102 is an original point. The ID is identification information to identify each touch point. In the present exemplary embodiment, a number indicating an order of a touch point touching the input area 101 among the touch points detected by the detection unit 121 is used as an ID. Processing executed in step S201 will be described in detail below.

Then, in step S202, the determination control unit 122 determines whether the detection unit 121 has detected a plurality of touch points. In this case, the determination control unit 121 refers to the information stored in the storage unit 124 to calculate the number of touch points from the stored ID, and determines whether the number of detected touch points is plural. If it is determined that a plurality of touch points has been detected (YES in step S202), the processing proceeds to step S203. If it is not determined that a plurality of touch points has been detected (NO in step S202), the processing proceeds to step S205.

In step S203, the determination control unit 122 determines whether the number of touch points detected by the detection unit 121 has increased. In the present exemplary embodiment, if it is determined that the number of touch points detected by the detection unit 121 has increased based on the information regarding the plurality of touch points detected by the detection unit 121 (YES in step S203), whether to execute processing for determining validity of the input by the touch point is determined. This is because when the number of touch points by the user changes particularly at the time of addition of a new touch point, there is a high possibility that a new operation will be started in the information processing apparatus 100, involving accurate recognition of a point touched by the user for the purpose of inputting.

In the present exemplary embodiment, the detection unit 121 updates the information regarding the touch points stored in the storage unit 124 each time the user newly touches the input region 102, moves a touching finger, or releases touching to change the state of the detected touch point. The ID among the pieces of stored information concerns the number of touch points detected by the detection unit 121. Accordingly, the determination control unit 122 refers to the ID each time the information stored in the storage unit 124 is updated to compare the number of touch points in the last processing flow with that of touch points in a current processing flow, and determines whether the number of touch points has increased. If it is determined that the number of detected touch points has increased (YES in step S203), the determination control unit 122 instructs the determination unit 123 to execute determination of validity of the touch point, and the processing proceeds to step S204. On the other hand, if it is determined that the number of detected touch points has not increased (NO in step S203), in other words, the number has decreased or has been maintained, it can be considered that the operation has ended or been continued. Thus, in the present exemplary embodiment, the determination unit 123 does not carry processing for determining validity of the touch point. The processing proceeds to step S205.

Then, in step S204, the determination unit 123 determines whether an input to the information processing apparatus 100 by each detected touch point is valid. In the present exemplary embodiment, an input by a touch point of the input region 102 touched for a predetermined time or longer is determined to be invalid. Then, the determination unit 123 determines that an input by a touch point not touched for the predetermined time or longer is valid, and notifies the recognition unit 125 of the determination result. This is because of a high possibility that when the user increases the number of touch points to start a certain operation, a touch point continuously touched without any state change for the predetermined time or longer may have no relation to the operation to be started. The processing executed in step S204 will be described in detail below.

In step S205, the determination unit 123 determines that inputs by all touch points other than the touch points determined invalid by the determination unit 123 among the detected touch points are valid, and notifies the recognition unit 125 of the determination result. In step S206, the recognition unit 125 recognizes input information by the touch points determined valid by the determination unit 123, and ends the processing of recognizing the user's touch input.

Figure 3A:
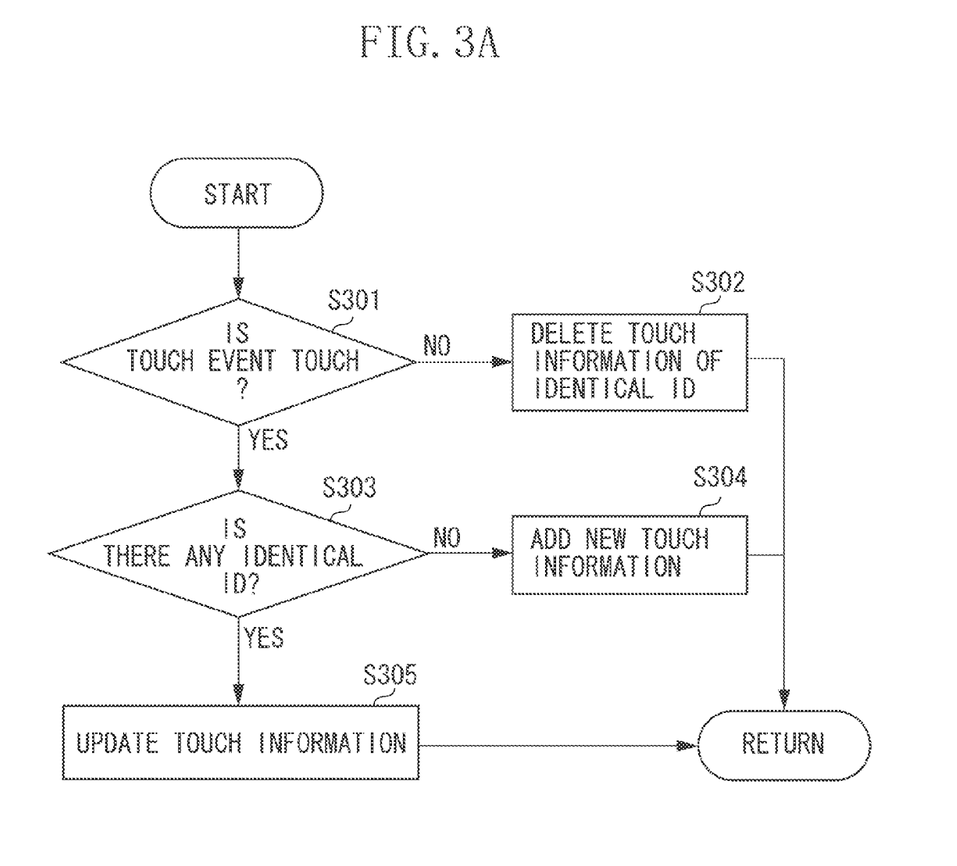
FIG. 3A is a flowchart illustrating an example of a processing flow of detecting a touch input.

FIG. 3A is a flowchart illustrating a flow of touch point detection processing executed in step S201. First, in step S301, the detection unit 121 determines whether a touch event notified from the touch panel is "TOUCH". The touch panel used in the present exemplary embodiment notifies of "TOUCH" as a touch event when touching is detected, and "RELEASE" as a touch event when the detected touching is released. If it is determined that the notified touch event is "TOUCH" (YES in step S301), the processing proceeds to step S303. If it is determined that the notified touch event is not "TOUCH", in other words, "RELEASE" (NO in step S301), the processing proceeds to step S302.

In step S302, the detection unit 121 deletes, among the pieces of information stored in the storage unit 124, information associated with ID corresponding to the touch point detected to be "RELEASE" with the ID. On the other hand, in step S303, the detection unit 121 determines whether a touch point of an ID similar to that of the touch point detected to be "TOUCH" has been detected. The detection unit 121 refers to the information stored in the storage unit 124 to determine whether a corresponding ID is included. If it is determined that the touch point of a similar ID has been detected (YES in step S303), the processing proceeds to step S305. IF it is determined that the touch point of a similar ID has not been detected (NO in step S303), the processing proceeds to step S304.

In step S304, the detection unit 121 newly adds information about the ID, coordinates, and detection time of the touch point detected to be "TOUCH". In the present exemplary embodiment, based on what number in order the point has been touched, IDs of numbers 1, 2, . . . are allocated in a detection order. In a case where the touch point is released to delete the stored information, even if an ID similar to the deleted ID is allocated to a touch point subsequently touched, it is treated as a different touch point.

In step S305, among the pieces of information stored in the storage unit 124, the information about the coordinates and the detection time of the ID similar to that of the touch point detected to be "TOUCH" is updated. In the present exemplary embodiment, if acquired position information indicates movement by a distance equal to or greater than a predetermined distance from a position of the touch point of the same ID stored before the updating, information about the position after the movement and information about time of detecting the touch point at this position are added. Detection start time is updated based on the information of this time. Then, the processing returns to the main operation of recognizing a multi-touching operation FIG. 2). The predetermined distance in this case is preset based on a minimum distance required of the touch point to move so that the user can carry out a touching operation. To distinguish a plurality of operations from one another, a plurality of staged threshold values can be set. In the present exemplary embodiment, if movement less than the predetermined distance is detected, the touch point is processed determining that it has not moved, i.e., stopped, and the information about the position and the detection time of the touch point is not updated.

In the present exemplary embodiment, the touch panel is used for notifying of "TOUCH" as the touch event when the touch point is detected, and "RELEASE" as the touch event when the detected touch event is released. However, the present disclosure is not limited to this. For example, "TOUCH_DOWN" is notified if the input region 102 is newly touched, "MOVE" is notified if the movement of the touch point of the detected ID is detected, and "TOUCH_UP" is notified if released. In this case, if "TOUCH_DOWN" is notified, information to be stored in the storage unit 124 is newly added. If "MOVE" is notified, the information of the same ID is updated. If "TOUCH_UP" is notified, the information of the same ID is deleted.

Thus, the information processing apparatus 100 manages information by identifying based on ID the plurality of touch points detected on the touch panel that is an input device. Since each of the plurality of touch points can be detected, a multi-touching operation including the touch points can be recognized.

Figure 3B:
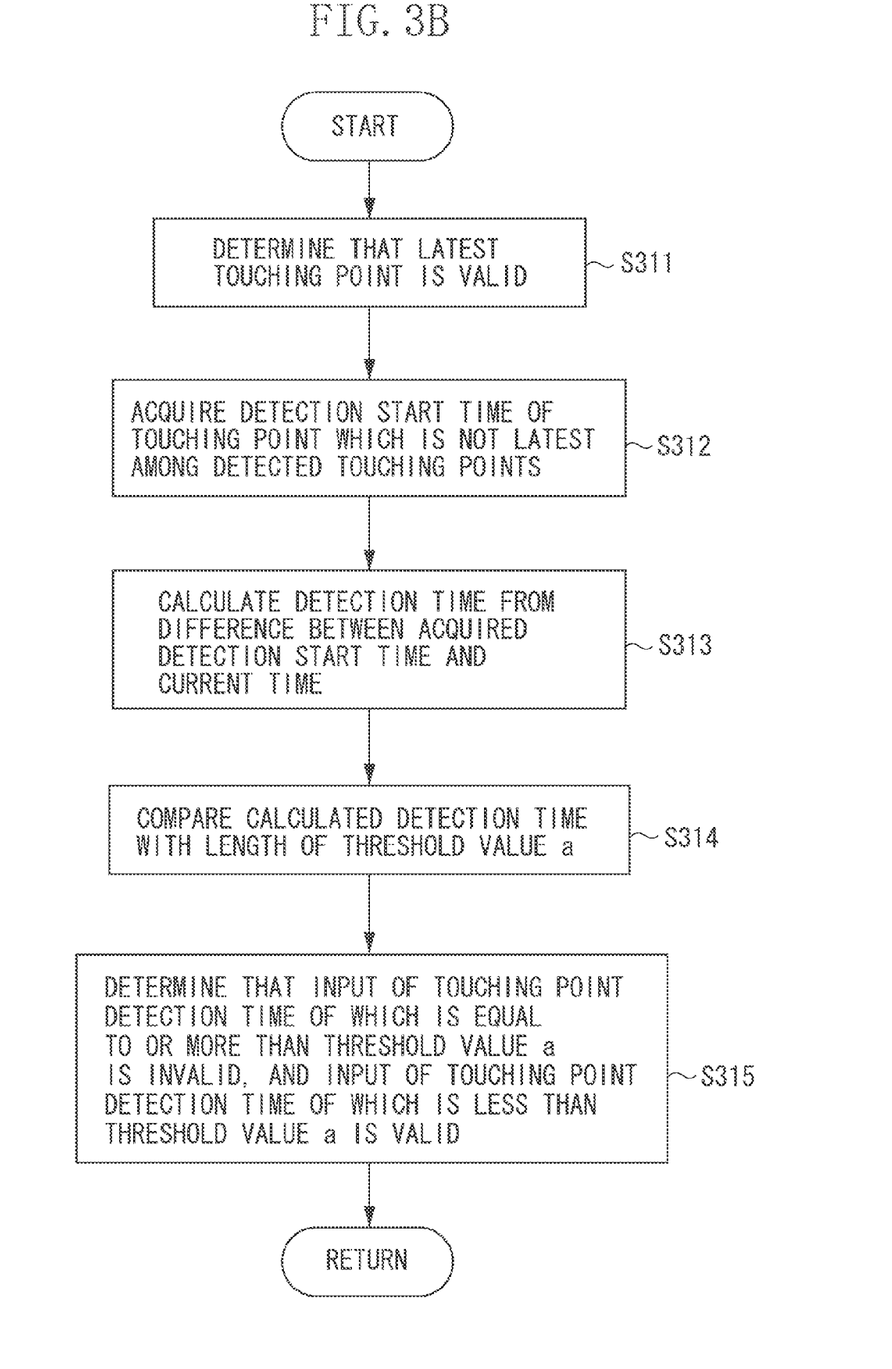
FIG. 3B is a flowchart illustrating an example of a processing flow of determining whether inputting of a touch point is valid.

FIG. 3B is a flowchart illustrating processing for determining whether the touch point is valid as an input, which is executed in step S204 of the present exemplary embodiment. First, in step S311, the determination unit 123 determines that a latest touch point is valid as an input to the information processing apparatus 100. Then, in steps thereafter, processing is carried out only for touch points not latest.

In step S312, the determination unit 123 acquires detection start time of a touch point not latest among the detected touch points. The detection start time is detection time when a certain touch point is detected first by the detection unit 121 or the touch point is moved. The determination unit 123 can acquire the information about the ID and the detection time of each stored touch point by referring to the information regarding the touch point stored in the storage unit 124 in step S201. Among the pieces of information indicating detection time regarding the touch point of the same ID, oldest detection time is detection start time.

Then, in step S313, the determination unit 123 calculates detection time, namely, time of detecting the touch point, from a difference between the acquired detection start time and current time. In other words, the detection time is when the touch point is stopped. The current time, which is time when the processing of step S204 is started, normally corresponds to detection start time of a latest touch point, and thus it can be acquired from the information stored in the storage unit 124.

In step S314, the determination unit 123 compares the detection time acquired in step S313 with a predetermined threshold value a (first threshold value). The threshold value a is for determining whether touching to the input region 102 is continued for a time longer than time generally taken by the user to carry out a touch-input operation, and can be arbitrarily set. Then, in step S315, the determination unit 123 determines that, among the touch points not latest, an input of a touch point of detection time longer than the threshold value a is invalid, and an input of a touch point of detection time less than the threshold value a is valid. After an end of step S315, the processing returns to the processing of recognizing the user's touch input illustrated in FIG. 2.

Figure 4A:
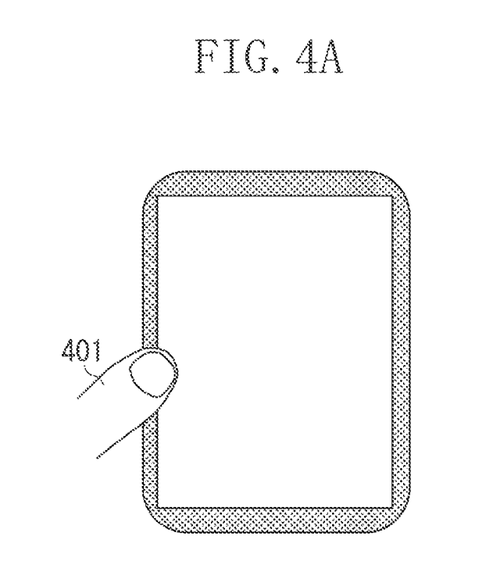
FIG. 4A illustrates one operation example of the information processing apparatus.
Figure 4B:
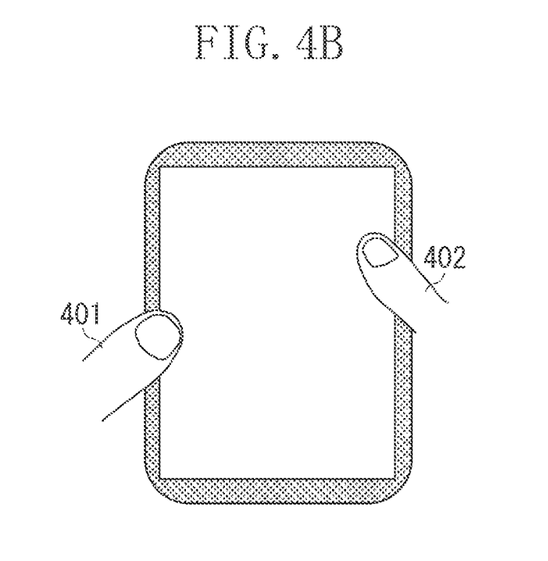
FIG. 4B illustrates one operation example of the information processing apparatus.

An operation example 1 where the user operates the information processing apparatus 100 according to the first exemplary embodiment will be specifically described. FIGS. 4A and 4B illustrate operation examples of the information processing apparatus 100. FIG. 4A illustrates a state where the user holds the information processing apparatus 100 seen from the input region 102 side. The user holds the information processing apparatus 100 by the left hand, and a thumb 401 of the user's left hand touches the input region 102. Accordingly, in step S201, the detection unit 121 detects information about a touch point by the thumb 401, and the storage unit 124 stores the information. With a position of the touch point set to coordinates (10, 200), detection start time set to 0 [ms], and ID set to 1, the storage unit 124 stores the information about the touch point. In this state, the number of touch points detected by the detection unit 121 is not plural, nor the touch point is a touch point determined invalid, and thus in step S205, determination unit determines that all inputs by the touch points are valid. Then, in step S206, the recognition unit 125 that has received the determination result recognizes the input information.

FIG. 4B illustrates a state, seen from the input region 102 side, where the user further touches the input region 102 by the right hand while supporting the information processing apparatus 100 by the left hand as illustrated in FIG. 4A. At this time, the thumb 401 of the user's left hand and an index finger 402 of the right hand touch the input region 102. Accordingly, in step S201, the detection unit 121 detects touch points caused by the user's thumb 401 and index finger 402. Each information about the touch point is indicated with a position of the thumb 401 set to coordinates (10, 200), detected time set to 1500 [ms], and touch ID set to 1.

Information about the latest touch point by the index finger 402 is stored in the storage unit 124 with a position set to coordinates (250, 100), detected time set to 1500 [ms], and ID set to 2. In this case, two touch points, namely a plurality of touch points, have been detected, and the number of touch points has increased from 1 to 2. Accordingly, in step S203 the determination control unit 122 instructs the determination unit 123 to execute processing for determining whether the inputs by the touch points are valid. In step S311, the determination unit 123 determines that the input is valid because the touch point of ID of 2 (hereinafter, touch point 2) is latest touch points.

Then, in step S312, to determine whether inputs by other touch points are valid, the determination unit 123 acquires detection start time of a touch point not latest among the detected touch points from the information stored in the storage unit 124. In the operation example 1, the latest touch point is a touch point 2, and a touch point not latest is a touch point (touch point 1) of ID of 1. Detection start time of the touch point 1 is 0 [ms]. Then, in step S313, the determination unit 123 calculates detection time from a difference between the acquired detection start time and current time of detecting the latest touch point. In the operation example 1, since the current time is 1500 [ms], the detection time is 1500 [ms].

Then, in step S314, the determination unit 123 compares the detection time with a length of the predetermined threshold value a. If the threshold value is assumed to be 500 [ms], the detection time of the touch point 1 is determined to be longer than the threshold value a. Thus, in step S315, the determination unit 123 determines that the input by the touch point 1 is invalid. In step S205, information about the touch point 2 determined valid is notified to the recognition unit 125. In step S206, the recognition unit 125 recognizes coordinates (250, 100) as positional information of the touch point 2.

Thus, in the operation example 1, by applying the present exemplary embodiment, in the information processing apparatus 100 capable of carrying out a multi-touching operation, erroneous operations occurred by recognizing the touch point 1 of the input region 102 touched by the user to support the apparatus as the input can be prevented.

As described above, according to the first exemplary embodiment, if the plurality of touch points is detected, whether the touch point not latest in the state change of the touch point among the plurality of detected touch points is valid is determined. Especially, when the number of detected touch points increases, estimating that the user is trying to carry out an operation by the latest touch point, whether the touch point not latest among the plurality of detected touch points is valid is determined. According to the first exemplary embodiment, it is determined that the input by the touch point of the detection time equal to or longer than the predetermined time (threshold value a) is invalid. This is because the touch point of the long detection time at the point of time when the start of the operation by the user is estimated is not associated with the operation started by the user, and it is considered that the hand supporting the information processing apparatus 100 is highly likely to be in touch with the input region 102.

Thus, by determining the validity of the touch point not latest when the number of detected touch points increases, a possibility that touch points more than necessary will be invalid to disable recognition of the user's operation can be reduced. For example, in the case of the first exemplary embodiment, if inputs by touch points of detection time equal to or longer than the predetermined time are uniformly invalid, an operation accompanied by long touching equal to or longer than the predetermined time referred to as "long pressing" is not recognized, causing a result against user's intention. Thus, at the time of detecting a new touch point, i.e., at timing of a high possibility that the user will start an operation to the information processing apparatus 100, the validity of the touch point detected previously is determined. This enables recognition of an operation accompanied by long touching equal to or longer than the predetermined time at the latest touch point estimated to have been touched by the user intending to carry out an operation. As a result, in the information processing apparatus 100 according to the present exemplary embodiment, erroneous operations against a user's intention can be reduced.

In step S204, the determination unit 123 can further calculate a moving distance from the position information of the touch point not latest, and determine whether the touch point not latest is valid based on whether the touch point has moved a distance equal to greater than a predetermined distance. The determination unit 123 determines that the touch point having detection time equal to or greater than the threshold value a and moved a distance equal to or greater than the predetermined distance is valid. In addition, the determination unit 123 determines that the touch point having detection time equal to or greater than the threshold value and moved a distance less than the predetermined distance is invalid. Thus, the user can use even a finger used for supporting the apparatus such as the thumb 401 illustrated in FIGS. 4A and 4B for a multi-touch operation associated with the index finger 402 by moving the position.

The user can carry out multi-touch operations of further various patterns by recognizing inputs by touch points moved in contact. In the present exemplary embodiment, when calculating the time from the detection start time of the touch point not latest to the current time, the detection time of the latest touch time is used as the current time. Accordingly, a time difference can be calculated between the detection start time of the touch point not latest and the detection start time of the latest touch point, and the length can be compared with the predetermined time.

In the comparison of the detection time of the touch point not latest with the length of the predetermined time (threshold value a) in step S314, the length of the time of the threshold value as the comparison target may be changed based on the detection order of the touch. For example, the determination unit 123 acquires information of an ID indicating the detection order of the touch point from the storage unit 124, and compares the length of the detection time with a threshold value a' smaller than the threshold value a for a touch point of ID of 1, namely, a first detected touch point. Accordingly, the first detected touch point is actively made invalid. This is because if the user supports the information processing apparatus 100 by hand to carry out an operation, there is a high possibility that the user will hold the information processing apparatus 100 at the first detected touch point and execute an input operation at the second touch point and after. In other words, since the first detected touch point is highly likely to be a touch by the hand for supporting the information processing apparatus 100, by actively invalidating the touch point, the determination unit 123 can precisely determine whether the input by the touch point is valid when a user holds the apparatus and immediately operates it.

Next, a second exemplary embodiment of the present exemplary embodiment will be described. In the first exemplary embodiment, if the number of touch points detected by the detection unit 121 increases, whether to execute the processing for determining the validity of the inputs caused by the touch points is determined. Different from the first exemplary embodiment, in the second exemplary embodiment, if movement of a position of a part of a plurality of detected touch points is detected, whether to execute processing for determining validity of inputs by the touch points is determined. If a user moves a touch point, there is a high possibility that the user has intention of starting a certain operation by using the moved touch point. Thus, in the present exemplary embodiment, at the latest time when the user moves the touch point, whether a touch point other than the touch point latest movement of which has been detected is valid is determined.

Figure 5:
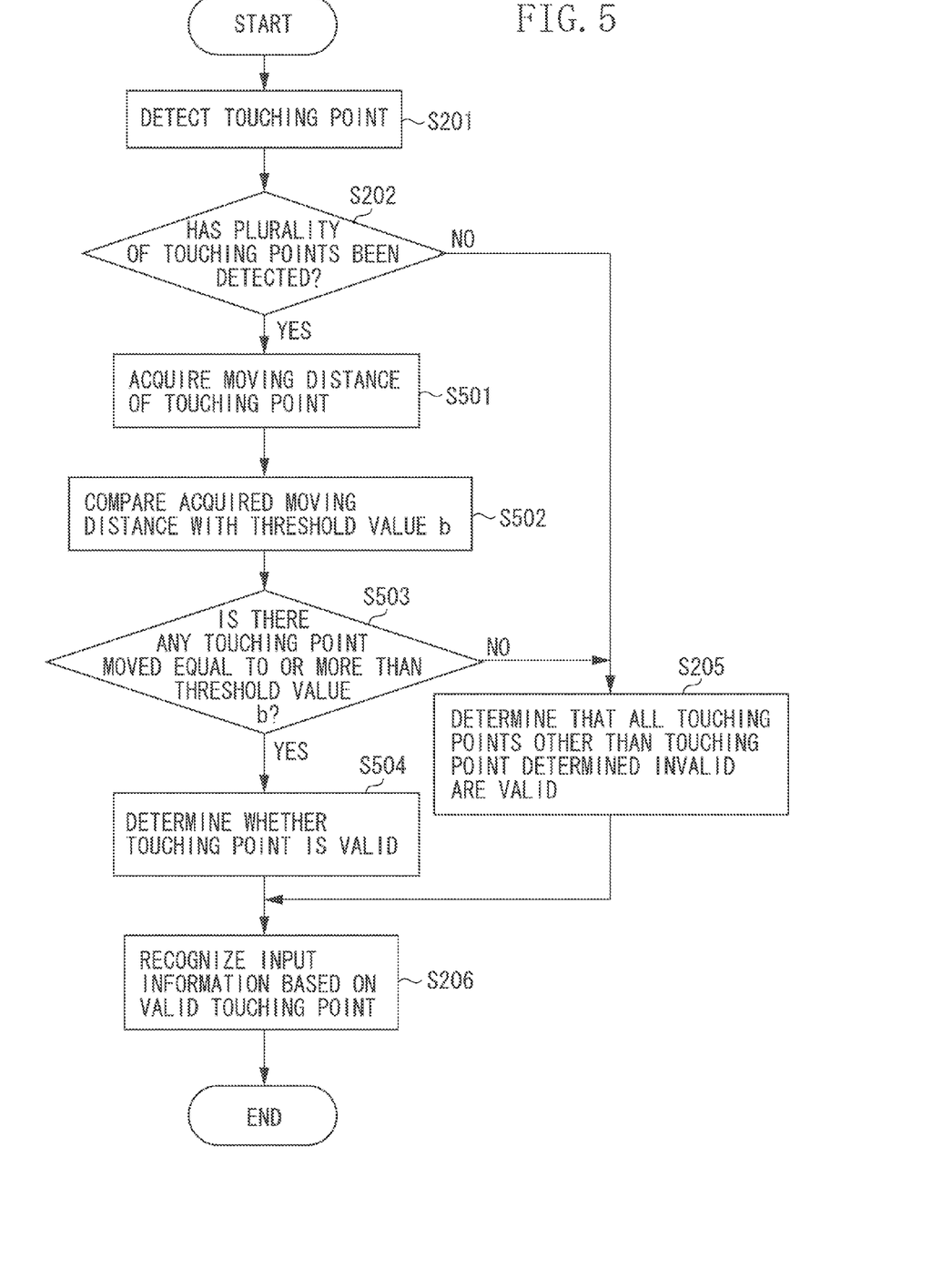
FIG. 5 is a flowchart illustrating an example of a processing flow of recognizing a user's touch input.

FIG. 5 is a flowchart illustrating processing executed to recognize a user's touch input according to the second exemplary embodiment. In steps having numbers identical to those illustrated in FIG. 2, processing similar in content to that of the first exemplary embodiment is executed.

However, in the present exemplary embodiment, if it is determined that a plurality of touch points has been detected (YES in step S202), the processing proceeds to step S501. In step S501, a determination control unit 122 acquires a moving distance of each detected touch point. In this case, the determination control unit 122 refers to information regarding touch points stored in a storage unit 124 in step S201, and calculates a moving distance of each detected touch point from information about a position, ID, and detected time of each stored touch point. At this time, a start point of the calculation of the moving distance is a position of a touch point at the last time when the information stored in the storage unit 124 is updated.

In step S502, the moving distance of each touch point is compared with a magnitude of a threshold value b (second threshold value). The threshold value b is a threshold value of a distance for determining whether it can be determined that the user has moved the touch point to carry out a touching operation. The threshold value b is set to a size approximately equal to a minimum moving distance of the touch point necessary for recognizing a touching operation registered beforehand in the information processing apparatus 100.

In step S503, the determination control unit 122 determines whether there is any touch point moved equal to or greater than the threshold value b based on a result of the comparison. The detected movement equal to or greater than the threshold value b is movement made in detection of a latest touch pint, and thus it is latest movement. If it is determined that there is a touch point moved equal to or greater than the threshold value b (YES in step S503), the processing proceeds to step S504 to determine whether an input by the touch point is valid. The processing content of step S504 will be described below. On the other hand, if it is determined that among the plurality of detected touch points, there is no touch point moved equal to or greater than the threshold value b (NO in step S503), the processing proceeds to step S205.

In step S205, the determination unit 123 determines that inputs by all touch points other than the touch points determined invalid by the determination unit 123 among the detected touch points are valid, and notifies the recognition unit 125 of the determination result.

In step S206, as in the case of the first exemplary embodiment, the recognition unit 125 that has received the determination result recognizes input information.

Figure 6:
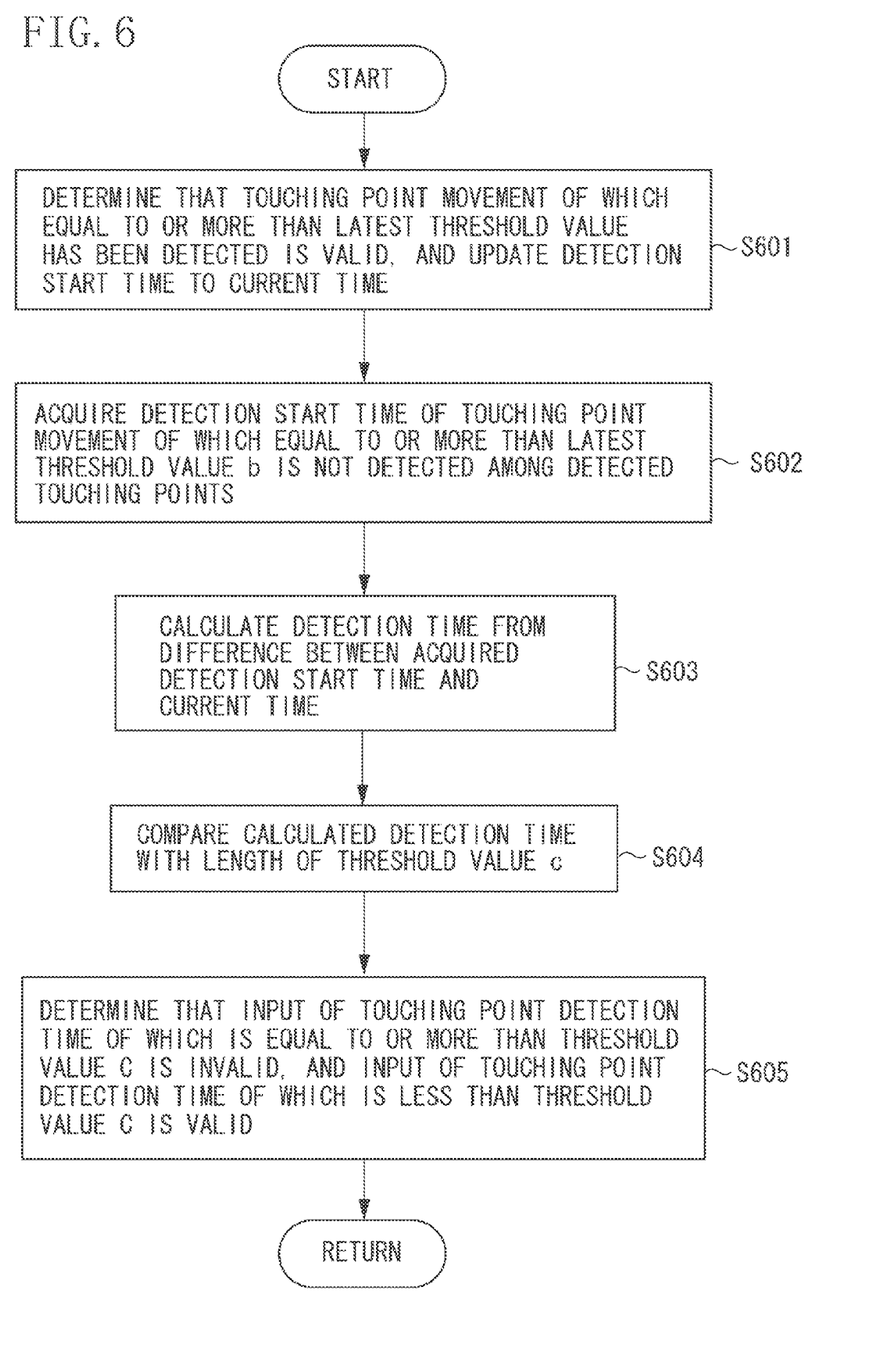
FIG. 6 is a flowchart illustrating an example of a processing flow of determining whether inputting of a touch point is valid.

FIG. 6 is a flowchart illustrating processing executed in step S504 according to the second exemplary embodiment to determine whether the touch point is valid as an input. First, in step S601, the determination unit 123 determines, based on the moving distance of each touch point acquired in step S502, that the touch point moved equal to or greater than the threshold value b, namely, the touch point the latest movement of which has been detected, is valid as an input to the information processing apparatus 100. In steps thereafter, processing will be executed only for the touch points not moved equal to or greater than the threshold value b.

In step S602, the determination unit 123 acquires detection start time of, among the detected touch points, a touch point not moved equal to or greater than the threshold value b, namely, a touch point that is not the touch point the latest movement of which has been detected. In step S603, the determination unit 123 calculates detection time of the touch point from a difference between the acquired detection start time and current time. The current time, which is time of starting step S504, normally corresponds to time when moving the touch point equal to or greater than the threshold value b is detected. Thus, it can be acquired from the information stored in the storage unit 124. In step S604, the determination unit 123 compares the acquired detection time with a length of a predetermined threshold value c (third threshold value). The threshold value c is for determining whether touching of the input region 102 is continuing for a time longer than time generally taken by the user to carry out a touch-input operation, and can be arbitrarily set. Then, in step S605, the determination unit 123 determines that, among the touch points not moved equal to or greater than the threshold value b, an input of a touch point of detection time equal to or longer than the threshold value c is invalid, and an input of a touch point of detection time less than the threshold value c is valid. After an end of step S605, the processing returns to the recognition of the user's touch input illustrated in FIG. 2.

Figure 7A:
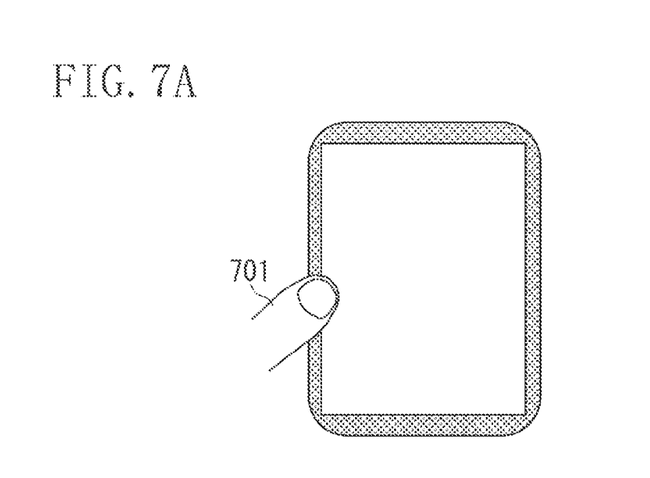
FIG. 7A illustrates one operation example of the information processing apparatus.
Figure 7B:
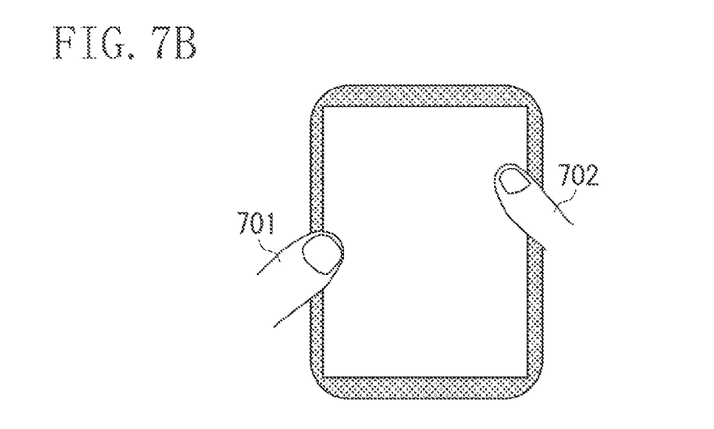
FIG. 7B illustrates one operation example of the information processing apparatus.
Figure 7C:
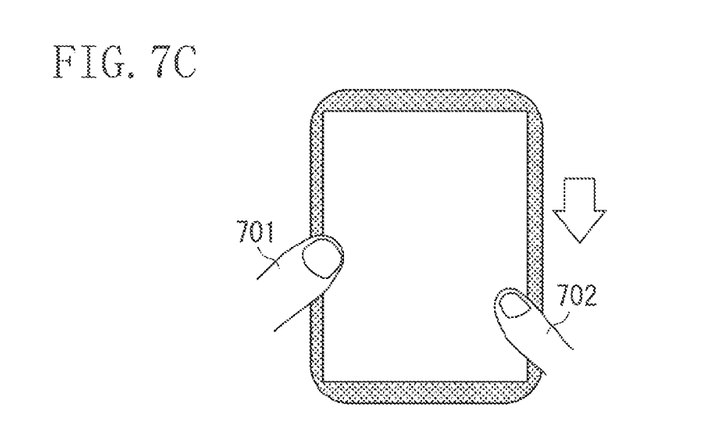
FIG. 7C illustrates one operation example of the information processing apparatus.

An operation example 2 where the user operates the information processing apparatus 100 according to the second exemplary embodiment will be specifically described. FIGS. 7A to 7C illustrate operation examples of the information processing apparatus 100. FIG. 7A illustrates a state where the user holds the information processing apparatus 100 seen from the input region 102 side. The user holds the information processing apparatus 100 by the left hand, and a thumb 701 of the user's left hand touches the input region 102. Accordingly, in step S201, the detection unit 121 detects information about a touch point caused by the thumb 701, and the storage unit 124 stores the information. With a position of the touch point set to coordinates (10, 200), detection start time of first detecting the touch point set to 0 [ms], and ID set to 1, the storage unit 124 stores the information about the touch point. In this state, the number of touch points detected by the detection unit 121 is not plural, nor the touch point is a touch point determined invalid, and thus in step S205, the determination unit determines that all inputs by the touch points are valid. Then, in step S206, the recognition unit 125 recognizes the input information.

FIG. 7B illustrates a state, seen from the input region 102 side, where the user further executes a touching operation while supporting the information processing apparatus 100 by the left hand as illustrated in FIG. 7A. The user holds the information processing apparatus 100 by the left hand, and inputs data by the right hand. At this time, the thumb 701 of the user's left hand and an index finger 702 of the right hand touch the input region 102. Accordingly, in step S201, the detection unit 121 detects touch points caused by the user's thumb 701 and index finger 702, and updates the information stored in the storage unit 124. Information about the touch point is indicated with a position of the thumb 701 set to coordinates (10, 200), detected time set to 1500 [ms], and touch ID set to 1.

Information about the touch point by the index finger 702 is stored in the storage unit 124 with a position set to coordinates (290, 100), detected time set to 1500 [ms], and ID set to 2. In this case, two touch points, namely a plurality of touch points, have been detected (YES in step S202). Thus, in step S501, a determination control unit 122 acquires a moving distance of each detected touch point. Then, in step S502, the acquired moving distance of each point is compared with the threshold value b. In this case, the threshold value b is assumed to be 10 [dot]. A moving distance of a touch point 1 is 0 [dot], and a moving distance of a touch point 2 is 0 [dot] because of first detection. Accordingly, neither exceeds the threshold value (NO in step S503). Thus, in step S205, the determination unit determines that all inputs caused by the touch points are valid. Then, in step S206, the recognition unit 125 recognizes the input information.

FIG. 7C illustrates a state where the user further moves the touch point while keeping touching of the index finger 702 to the input region 102. The user continues to hold the information processing apparatus 100 by the left hand, and input data by the right hand, and the thumb 701 and the index finger 702 of the right hand touch the input region 102. Accordingly, in step S201, the detection unit 121 detects touch points by the user's thumb 701 and index finger 702, and updates the information stored in the storage unit 124. Information about the touch point is indicated with a position of the thumb 701 set to coordinates (10, 200), detected time set to 1500 [ms], and touch ID set to 1. Further, information is stored in the storage unit 124 with a position of the touch point of the index finger 702 set to coordinates (290, 250), detected time set to 2000 [ms], and ID set to 2. In this case, two touch points, namely a plurality of touch points, have been detected (YES in step S202). Thus, in step S501, the determination control unit 122 acquires a moving distance of each detected touch point.

The moving distance of the touch point 1 is 0 [dot]. The moving distance of the touch point 2 is 150 [dot] in an arrow direction illustrated in FIG. 7C (lower direction in the input region 102) because the coordinates have changed from (290, 100) to (290, 250). In the operation example 2, since the threshold value b is 10 [dot], the touch point of ID of 2 (hereinafter, touch point 2) has moved equal to or greater than the threshold value b. Accordingly, in step S503, the determination control unit 122 determines that there is at least one point moved equal to or greater than the threshold value b, and causes the determination unit 123 to execute processing for determining validity of the touch point. First, in step S601, the determination unit 123 determines that the touch point 2, the latest movement of which has been detected, is valid as an input.

In step S602, to determine whether a touch point other than the touch point the latest movement of which has been detected is valid, the determination unit 123 acquires detection start time of, among the detected touch points, a touch point not moved equal to or greater than the threshold value b from the information stored in the storage unit 124. In the operation example 2, it is only the touch point 2 that has moved equal to or greater than the threshold value b, and a touch point not moved is a touch point (touch point 1) of ID of 1. Detection start time of the touch point 1 is 1000 [ms]. Then, in step S603, the determination unit 123 calculates detection time from a difference between the acquired detection start time and current time (time when movement of the touch point 2 is detected). In the operation example 2, since the current time is 2000 [ms], the detection time is 1000 [ms].

In step S604, the determination unit 123 compares the detection time with the length of the predetermined threshold value c. If the threshold value c is assumed to be 500 [ms], the detection time of the touch point 1 is determined to be longer than the threshold value c. Thus, in step S605, the determination unit 123 determines that the input of the touch point 1 is invalid. Then, in step S205, information of the touch point 2 determined valid is notified to the recognition unit 205. In step S206, the recognition unit 125 recognizes, as input information, coordinates (250, 100) of latest position information of the touch point 2.

As described above, according to the second exemplary embodiment, if the plurality of touch points is detected, it is determined whether a detected touch point among the plurality of detected touch points is valid. Especially, if latest movement of at least one of the plurality of touch points is detected, estimating that the user is trying to carry out an operation by the touch point moved by the user, it is determined whether an input by the touch point latest movement of which has not been detected is valid. If the detected touch point moves, there is a high possibility that the user will start an operation in the information processing apparatus 100.

Thus, erroneous operations can be prevented to recognize input information by accurately distinguishing a touch point touched used for an operation from a touch point not used for an operation when the movement of one of plural touch points is detected. In this case, the touch point, the latest movement of which has been detected, highly likely to be used for the operation to be started is determined to be valid. Among the touch points movement of which has not been detected, a touch point detection time of which is longer than the predetermined time is determined to be invalid. This is because the touch point already having long detection time at the point of time when starting the operation by the user is estimated has no relation to the operation executed by the user, and it is considered that the hand supporting the information processing apparatus 100 is highly likely to be in touch with the input region 102. Thus, in the information processing apparatus 100 according to the second exemplary embodiment, erroneous operations against a user's intention can be reduced.

According to the present exemplary embodiment, as in the case of the first exemplary embodiment, by changing the threshold value in the detection order of the touch points, the first touch point highly likely to be a touch by the finger for supporting the apparatus, can be actively invalidated. As a result, whether the input by the touch point is valid can be precisely determined when a user holds the apparatus and immediately operates it.

Other Embodiments

Aspects of the present disclosure can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2012-022076 filed Feb. 3, 2012, which is hereby incorporated by reference herein in its entirety.

What is claimed is:

1. An information processing apparatus comprising:
a detection unit configured to detect touch points on a touch panel touched by a user;
a determination unit configured to determine, in a case where the detection unit detects a plurality of touch points and a number of touch points detected by the detection unit increases, whether each of a plurality of touch points that is not a most recent touch point among the plurality of touch points detected by the detection unit is valid for a multi-touch operation; and
a recognition unit configured to recognize information regarding the most recent touch point and each touch point determined to be valid by the determination unit as input information.

2. The information processing apparatus according to claim 1, wherein
the determination unit determines that the most recent touch point among the plurality of touch points is valid, and
the recognition unit recognizes information regarding each touch point determined to be valid by the determination unit as input information for a multi-touch operation.

3. The information processing apparatus according claim 1, wherein the determination unit determines, in a case where the detection unit detects a plurality of touch points and a number of touch points detected by the detection unit increases, that among each of the plurality of touch points that is not the most recent touch point, a touch point having a detection period where touching by the user is continuously detected longer than a predetermined period is invalid.

4. An information processing apparatus comprising:
a detection unit configured to detect touch points on a touch panel touched by a user;
a determination unit configured to determine, in a case where the detection unit detects a plurality of touch points and at least one of the touch points detected by the detection unit is detected at a point moved away from a previously touched position, whether each of a plurality of touch points that is not moved by a distance equal to or greater than a predetermined distance among the plurality of touch points detected by the detection unit is valid for multi-touch operation; and
a recognition unit configured to recognize information regarding each touch point moved by the distance equal to or greater than the predetermined distance and each touch point determined to be valid by the determination unit as input information.

5. The information processing apparatus according to claim 4, wherein the determination unit determines, in a case where the detection unit detects a plurality of touch points and at least one of the touch points detected by the detection unit is detected at a point moved away from a previously touched position in direction parallel to the touch panel, whether each of a plurality of touch points that is not moved in direction parallel to the touch panel by the distance equal to or greater than a predetermined distance among the plurality of touch points detected by the detection unit is valid for a multi-touch operation.

6. The information processing apparatus according to claim 4, wherein the determination unit determines, in a case where the detection unit detects a plurality of touch points and at least one of the touched points detected by the detection unit is detected at a point moved away from a previously touched position, that among touch points not moved by the distance equal to or greater than the predetermined distance, a touch point having a detection period where touching by the user is continuously detected longer than a predetermined period is invalid.

7. The information processing apparatus according to claim 4, wherein the determination unit determines that each touch point moved by the distance equal to or greater than the predetermined distance is valid, and the recognition unit recognizes information regarding each touch point determined to be valid by the determination unit as input information for a multi-touch operation.

8. A method for controlling an information processing apparatus, the method comprising:
periodically detecting touch points on a touch panel touched by a user;
determining, in a case where a plurality of touch points is detected by the detecting and a number of detected touch points increases, whether each of a plurality of touch points that is not a most recent touch point among the plurality of detected touch points is valid for a multi-touch operation; and
recognizing information regarding the most recent touch point and each touch point determined to be valid by the determining as input information.

9. The method for controlling the information processing apparatus according to claim 8, wherein,
the determining determines that the most recent touch point among the plurality of touch points is valid, and
the recognizing recognizes information regarding each touch point determined to be valid by the determining as input information for a multi-touch operation.

10. A method for controlling an information processing apparatus, the method comprising:
periodically detecting touch points on a touch panel touched by a user;
determining, in a case where a plurality of touch points is detected by the detecting and at least one of the detected touch points is detected at a point moved away from a touched position during previous detection, whether each of a plurality of touch points that is not moved by a distance equal to or greater than a predetermined distance among the plurality of detected touch points is valid for multi-touch operation; and
recognizing information regarding each touch point moved by the distance equal to or greater than the predetermined distance and each touch point determined to be valid by the determining as input information.

11. The method for controlling the information processing apparatus according claim 10, wherein,
the determining determines, in a case where the detection unit detects a plurality of touch points and at least one of the detected touch points is detected at a point moved away from a touched position during previous detection in direction parallel to the touch panel, whether each of a plurality of touch points that is not moved in direction parallel to the touch panel by the distance equal to or greater than a predetermined distance among the plurality of touch points detected by the detecting is valid for a multi-touch operation.

12. The method for controlling the information processing apparatus according to claim 10, wherein the determining determines, in a case where the detecting detects a plurality of touch points and at least one of the detected touched points is detected at a point moved away from a touch point during previous detection, that among touch points not moved by the distance equal to or greater than the predetermined distance, a touch point having a detection period where touching by the user is continuously detected longer than a predetermined period is invalid.

13. The method for controlling the information processing apparatus according to claim 10, wherein the determining determines that the touch point moved by the distance equal to or greater than the predetermined distance is valid, and the recognizing recognizes information regarding the touch points determined to be valid by the determining as input information for a multi-touch operation.

14. A non-transitory computer readable storage medium storing a program for causing a computer to perform a control method of an information processing apparatus, the control method comprising:
periodically detecting touch points on a touch panel touched by a user;
determining, in a case where a plurality of touch points is detected by the detecting and a number of detected touch points increases, whether each of a plurality of touch points that is not a most recent touch point among the plurality of detected touch points is valid for a multi-touch operation; and
recognizing information regarding the most recent touch point and each touch point determined to be valid by the determining as input information.

15. The non-transitory computer readable storage medium storing the program according to claim 14, wherein,
the determining determines that the most recent touch point among the plurality of touch points is valid, and
the recognizing recognizes information regarding the touch points determined to be valid by the determining as input information for a multi-touch operation.

16. A non-transitory computer readable storage medium storing a program for causing a computer to perform a control method of an information processing apparatus, the control method comprising:
detecting touch points on a touch panel touched by a user;
determining, in a case where the detecting detects a plurality of touch points and at least one of the detected touch points is detected at a point moved away from a touched position during previous detection by a distance equal to or greater than a predetermined distance among the plurality of the detected touch points is valid for multi-touch operation; and
recognizing information regarding each touch point moved by the distance equal to or greater than the predetermined distance and each touch point determined to be valid as input information.

17. The non-transitory computer readable storage medium storing the program according to claim 16, wherein,
the determining determines, in a case where the detecting detects a plurality of touch points and at least one of the detected touch points is detected at a point moved away from a touched position during previous detection in direction parallel to the touch panel, whether each of a plurality of touch points that is not moved in direction parallel to the touch panel by the distance equal to or greater than a predetermined distance among the plurality of touch points detected by the detecting is valid for a multi-touch operation.

18. The non-transitory computer readable storage medium storing the program according to claim 16, wherein the determining determines, in a case where the detecting detects a plurality of touch points and at least one of the detected touch points is detected at a point moved away from a touch during previous detection, that among touch points not moved by the distance equal to or greater than the predetermined distance, a touch point having a detection period where touch by the user is continuously detected longer than a predetermined period is invalid.

19. The non-transitory computer readable storage medium storing the program according to claim 16, wherein the determining determines that the touch point moved by the distance equal to or greater than the predetermined distance is valid, and the recognizing recognizes information regarding the touch points determined to be valid by the determining as input information for a multi-touch operation.

20. An information processing apparatus comprising:
a detection unit configured to detect touch points on a touch panel;
a determination unit configured to determine, in a case where a number of touch points detected by the detection unit increases, whether a touch point that is not a most recent touch point among the plurality of touch points detected by the detection unit is valid for a multi-touch operation; and
a recognition unit configured to recognize information regarding the most recent touch point and each touch point determined to be valid by the determination unit as input information.

21. The information processing apparatus according to claim 20, wherein the information processing apparatus is a portable terminal.

22. An information processing apparatus comprising:
a detection unit configured to detect touch points on a touch panel;
a determination unit configured to determine, in a case where the detection unit detects a plurality of touch points and at least one of the touch points detected by the detection unit is detected at a position moved away from a previously touched position, whether a touch point that is not moved by a distance equal to or greater than a predetermined distance among the plurality of touch points detected by the detection unit is valid for multi-touch operation; and
a recognition unit configured to recognize information regarding each touch point moved by the distance equal to or greater than the predetermined distance and each touch point determined to be valid by the determination unit as input information.

23. The information processing apparatus according to claim 22, wherein the information processing apparatus is a portable terminal.

24. A method for controlling an information processing apparatus, the method comprising:
detecting touch points on a touch panel;
determining, in a case where a number of detected touch points increases, whether a touch point that is not a most recent touch point among the plurality of detected touch points is valid for a multi-touch operation; and
recognizing information regarding the most recent touch point and each touch point determined to be valid as input information.

25. A method for controlling an information processing apparatus, the method comprising:
detecting touch points on a touch panel;
determining, in a case where the detecting detects a plurality of touch points and at least one of the detected touch points is detected at a position moved away from a previously touched position, whether a touch point that is not moved by a distance equal to or greater than a predetermined distance among the plurality of detected touch points is valid for multi-touch operation; and
recognizing information regarding the most recent touch point and each touch point determined to be valid as input information.

26. A non-transitory computer readable storage medium storing a program for causing a computer to perform a control method of an information processing apparatus, the control method comprising:
detecting touch points on a touch panel;
determining, in a case where a number of detected touch points increases, whether a touch point that is not a most recent touch point among the plurality of detected touch points is valid for a multi-touch operation; and
recognizing information regarding the most recent touch point and each touch point determined to be valid as input information.

27. A non-transitory computer readable storage medium storing a program for causing a computer to perform a control method of an information processing apparatus, the control method comprising:
detecting touch points on a touch panel;
determining, in a case where the detecting detects a plurality of touch points and at least one of the detected touch points is detected at a position moved away from a previously touched position, whether a touch point that is not moved by a distance equal to or greater than a predetermined distance among the plurality of detected touch points is valid for multi-touch operation; and
recognizing information regarding the most recent touch point and each touch point determined to be valid as input information.

* * * * *